US006607636B2

(12) United States Patent
Ross et al.

(10) Patent No.: US 6,607,636 B2
(45) Date of Patent: Aug. 19, 2003

(54) NON-REWETTING MULTI-FIBER HAND TOWEL AND METHODS OF MAKING SAME

(75) Inventors: Russell Frederick Ross, Suwanee, GA (US); Susan Elaine Smith, Appleton, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 10/026,400

(22) Filed: Dec. 21, 2001

(65) Prior Publication Data

US 2003/0098135 A1 May 29, 2003

Related U.S. Application Data

(60) Provisional application No. 60/336,552, filed on Nov. 1, 2001.

(51) Int. Cl.$^7$ .................. D21H 27/30; D21H 27/38; D21H 13/10
(52) U.S. Cl. ................... 162/129; 162/125; 162/141; 162/142; 162/149
(58) Field of Search .................. 162/123, 125, 162/129, 130, 132, 179, 576, 141, 142, 146, 149; 428/195, 218, 213, 137; 604/378, 376, 365–366, 358

(56) References Cited

U.S. PATENT DOCUMENTS

| | | | |
|---|---|---|---|
| 1,122,959 A | 12/1914 | Little | |
| 3,563,241 A | 2/1971 | Evans et al. | |
| 3,770,575 A | 11/1973 | Ball | |
| 3,838,692 A | 10/1974 | Levesque | |
| 3,934,975 A | 1/1976 | Kelly et al. | |
| 3,968,066 A | 7/1976 | Mueller | |
| 4,360,015 A * | 11/1982 | Mayer | 602/47 |
| 4,631,273 A | 12/1986 | Blehm et al. | |
| 4,721,647 A | 1/1988 | Nakanishi et al. | |
| 4,775,579 A * | 10/1988 | Hagy et al. | 442/329 |
| 4,933,097 A | 6/1990 | Keegan | |
| 4,986,882 A * | 1/1991 | Mackey et al. | 162/109 |
| 5,032,122 A | 7/1991 | Noel et al. | |
| 5,102,501 A * | 4/1992 | Eber et al. | 162/129 |
| 5,102,738 A | 4/1992 | Bell et al. | |
| 5,112,690 A | 5/1992 | Cohen et al. | |
| 5,273,596 A | 12/1993 | Newkirk | |
| 5,294,478 A * | 3/1994 | Wanek et al. | 428/218 |
| 5,389,202 A | 2/1995 | Everhart et al. | |
| 5,433,715 A | 7/1995 | Tanzer et al. | |
| 5,445,746 A | 8/1995 | Lee | |
| 5,466,513 A * | 11/1995 | Wanek et al. | 428/218 |
| 5,505,719 A * | 4/1996 | Cohen et al. | 604/372 |
| H1575 H | 8/1996 | Daugherty et al. | |
| 5,569,226 A * | 10/1996 | Cohen et al. | 604/378 |
| 5,595,567 A | 1/1997 | King et al. | |
| 5,607,550 A * | 3/1997 | Akers | 162/102 |
| 5,615,460 A | 4/1997 | Weirich et al. | |
| 5,647,864 A | 7/1997 | Allen et al. | |
| H1704 H | 1/1998 | Wallajapet et al. | |
| 5,840,403 A | 11/1998 | Trokhan et al. | |
| 5,990,377 A | 11/1999 | Chen et al. | |

FOREIGN PATENT DOCUMENTS

| | | |
|---|---|---|
| EP | 0308320 | 3/1989 |
| EP | 0326771 | 8/1989 |
| EP | 0373974 | 6/1990 |
| EP | 0506336 A1 | 9/1992 |
| GB | 1510667 | 5/1978 |
| GB | 1581486 | 12/1980 |
| WO | 99/46119 | 9/1999 |
| WO | 00/04233 | 1/2000 |
| WO | 00/34567 | 6/2000 |
| WO | 02/36339 | 5/2002 |

OTHER PUBLICATIONS

Abstract: "Paper Drying: Capillary Transfer Between Porous Compressible Materials", Wilder, Massachusetts Inst. Technol., Ph.D. thesis: (Jan. 1997).

"Capillary Mass Transfer", Makiya et al., AIChE Journal, vol. 18, No. 4, Jul. 1972, pp. 861–864.

"Surface Phenomena", Pulp Technology and Treatment for Paper, 1978, pp. 87–105.

"The Wetting Properties of Surfactant Modified Cellulose and Lignin Films", Lee et al. BP BIF Conference, 1979.

Abstract: "Waterproofing Paper With a Kaolin Filler Modified by Spontaneous Polymerization of Styrene", Diner et al., Sb, TR. TsNIB, Aktual. Vop. Khimii Tekhnol. Bumagi (Orekhov, B. V., ed.): 21–26 (1982 Moscow).

"Water Transfer Coefficient in Adsorptive Porous Body", Toei et al., Journal of Chemical Engineering of Japan, V. 16, No. 5, 1983, pp. 364–369.

"Preparation of Hydrophobic Cotton Cloth", Sharma et al., Biotechnology Letters vol. 6, No. 5 (1984), pp. 301–306.

"Viscose Fibres with Increased or Reduced Water Retention Capacity—Production and Performance Tests", Melliand Textilberichte [Eng. Ed.] Dec. 1984, pp. 729–733.

"Absorbency", Textile Science and Technology 7, Chatterjee (1985), pp. 29–147.

Abstract: "Fiber Surface Chemistry/Physics and its Function in Paper and Other Materials", SPCI (1 Villagatan, S114–32 Stockholm): (1986).

(List continued on next page.)

Primary Examiner—Jose A. Fortuna
(74) Attorney, Agent, or Firm—Steven D. Flack; Richard M. Shane

(57) ABSTRACT

An absorbent multilayered web includes a top surface layer, with the top surface layer including first and second fibers, wherein the first fibers are hydrophilic and the second fibers are hydrophobic, and further wherein the first and said second fibers are substantially uniformly distributed on the top surface layer, and at least one additional layer. A method of making an absorbent multi-layered web includes the steps of providing hydrophilic fibers; providing hydrophobic fibers; forming a first web layer of substantially uniformly distributed hydrophilic and hydrophobic fibers; creating at least a second web layer; and joining said first layer with said second layer.

38 Claims, 3 Drawing Sheets

OTHER PUBLICATIONS

"An ESCA Study of Chemical Reactions on the Surfaces of Cellulose Fibers", Zadorecki et al., Journal of Polymer Science, Part A: Polymer Chemistry, vol. 24, 737–745 (1986).

"Structure of Water in Thin Layers", Derjaguin et al., Langmuir 1987, 3, 607–612.

"Surfactant Additives: Theory and Applications in Aqueous Systems", Dickenson et al., 1987 Nonwovens Conference, TAPPI, pp. 17–22.

"Using the Transfer of a Langmuir Monolayer as a Probe of Wetting", Peng, et al., Thin Solid Films, 159 (1988) 215–219.

"Spreading of Liquids in Textile Assemblies", Textile Research Journal, vol. 58, No. 5 (1988), pp. 306–308.

"Preparation of Cellulose Power Having Hydrophobic Properties By Treatment With Textile Auxiliaries", Agafonova et al., FICYAP 21(4) 332–334 (1989).

"Superabsorbent Review: An Absorbing Year", Noonan, Nonwovens Industry, vol. 20, No. 8, p. 39.

"Modifications of jute by grafting for use in composites", Varma et al., Indian Journal of Textile Research, vol. 14, pp. 9–13, Mar. 1989.

"Surfactants to Improve the Wetting of Polyolefin Pulp/Wood Pulp Combination Pads", Research Disclosure, Feb. 1990; E.I. du Pont de Nemours & Co., Inc.

"On the theory of thermocapillary, or Marangoni, convention in the capillary water on paper fibers", Lehtinen, TAPPI Journal, vol. 73, No. 4 (Apr. 1990), pp. 209–213.

"A controlled release matrix using a mixture of hydrophilic and hydrophobic polymers", Al–Hmoud et al., International Journal of Pharmaceutics 68 (1991) R1–R3.

"Liquid sorption and wetting on hydrophilic/hydrophobic layer silicates", Dékány et al., Colloids and Surfaces, 58 (1991) 251–261.

Abstract: "Studies on the Improvement of Diaper with Special Reference to the Influence of its Skin–Sided Material on the Intra–Diaper Wetness", Kyoko et al., Journal of the Faculty of Education, Saga University, vol. 39, No. 2, p. 73–81, 1992.

"Sizing, An Overview", 1992 Sizing Short Course, TAPPI 1992, pp. 1–8.

"Gas–Liquid Mass Transfer in Taylor Flow Through a Capillary", Irandoust et al., The Canadian Journal of Chemical Engineering, vol. 70, Feb. 1992, pp. 115–119.

"Hydrophobic Films and Their Efficiency against Moisture Transfer. 1. Influence of the Film Preparation Technique", Martin–Polo et al., J. Agric. Food Chem. 1992 40, 407–412.

"Effects of Fibre and Fabric Properties on Fabric Drying Times", Crowe et al., National Technical Informatin Service, Aug. 1993.

"The wetting properties of grafted cellulose films", Toussaint et al., J. Adhesion Sci. Technol. vol. 7, No. 6, pp. 635–648 (1993).

"Water structure at hydrophobic interfaces studied by sum–frequency generation", Du et al., IQEC '94, pp. 162–163.

Abstract: "Sorption of 2, 4–Dichlorophenol and 2,4, 5–Trichlorophenol by Softwood Fibers", Severtson Dissertation Abstracts International, vol. 56/08–B, p. 4466.

Abstract: "Effect of Water on Paper; Actin of Water in the Liquid and Vaporous State, Theoretical Principles and Practical Impacts", Milichovsky, Pap. Celul. 50, No. 7/8: 170–173 (1995).

"Cold Plasma Modification of Lignocellulosic Materials", Young et al., International Symposium on Wood and Pulping Chemistry, $8^{th}$, 1995, pp. 637–644.

"A Tailormade Sizing System for Multi–Purpose Office and Printing Papers", Riebeling et al., Wochenblatt fur Papierfabrikation, vol. 123, No. 7 (1995).

"Forming handsheets for physical tests for pulp", TAPPI, T–205 sp–95.

"Effects of Surface–Size Treatment on Performance of Plain Paper in Non–Impact Printing", Barker et al., Annual Pulp and Paper Conference, 1996, pp. 603–611.

"Adsorption Forces Between Hydrophobic Monolayers", Yaminsky et al., Langmuir 1996, vol. 12, pp. 1936–1943.

"Characterization of Eucalpt Fibre Surface Using Inverse Gas Chromatography and X–ray Photoelectron Spectroscopy", Shen et al., Appita 1996, pp. 633–640.

Abstract: "Water Transfer aptitude of a beaten cellulosic pulp", Bruneau et al., Entropie, vol. 32, Issue: 195, pp. 41–49 (1996).

Abstract: Coating–Paper Interactions (Hydrophobicity, Porosity, Roughness, Uncalendered), Huang, Dissertation Abstracts International, vol. 58/04–B, p. 2008.

"Heat and Moisture Transfer in Capillary–Porous Bodies, Some Experimental Methods of Investigation", Bastian, Drying Technology, 15(9), 2145–2164 (1997).

"Adsorption of hydroxyethylcellulose or hydrophobically modified cellulose and anionic surfactant from their binary mixtures on particles", Yamanaka et al., Colloids Surfaces A: Physiochem. Eng. Aspects 122 (1997) pp. 121–133.

"Capillary thermomechanics in serially porous media, with implications for randomly porous media", Miller, Water Resources Research, vol. 34, No. 6, pp. 1361–1371, Jun. 1998.

"Octadecylamine as an internal sizing agent", Jing et al., TAPPI Journal, vol. 81, No. 4 (1998), pp. 193–197.

"Modeling of Heat and Mass Transfer in Capillary–Porous Materials", Akulich et al., Journal of Engineering Physics and Thermophysics, vol. 71, No. 2, 1998, pp. 225–233.

"Characterization of cellulose surface free energy", Dourado et al., J. Adhesion Sci. Technol, vol. 12, No. 10, pp. 1081–1090 (1998).

"Beating and refining response of some reinforcement pulps", Seth, TAPPI Journal, vol. 82, No. 3, pp. 147–155, Mar. 1999.

"Ultrahydrophobic and Ultralyophobic Surfaces: Some Comments and Examples", Chen et al., Langmuir, vol. 15, No. 10, pp. 3395–3399, 1999.

"A New Method for the Characterization of Porous Materials", Nguyen et al., Langmuir, vol. 15, No. 10, pp. 3608–3615, 1999.

"A Pore–Size–Dependent Equation of State for Multilayer Adsorption in Cylindrical Mesopores", Zhu et al., Langmuir, vol. 15, No. 10, pp. 3632–3641 (1999).

"A Multiscale Network Model for Simulating Moisture Transfer Properties of Porous Media", Carmeliet et al., Transport in Porous Media 35: 67–88, 1999.

"Material Safety Data Sheet—Parrafin wax (granular)", Fisher Scientific Website, 1999.

Con–Trol–Cure® Curing Control Products, www.uvprocess.com/products/Curecon/Physical/Surften/N001–011.htm.

"Welcome", www.torsionbalancesupplies.com/uk.

"Surface Tension", www.torsionbalancesupplies.com.uk/surfacetension.htm.

"Material Safety Data Sheet", Hercules MSDS—HERCON® 70 Sizing Emulsion, http://msds.plaza.herc.com/msds.

Abstract: "Water–Soluble Paper and Water Soluble Paper Treatments", Baker et al., National Technical Information Service.

* cited by examiner ly distributed on the first and second outer layers of the web. A third, middle layer is disposed between the first and second outer layers, and contains predominantly hydrophilic fibers. In an alternative embodiment of this embodiment, the second fibers make up from about 10 to about 50 percent of the first and second outer layers.

NON-REWETTING MULTI-FIBER HAND TOWEL AND METHODS OF MAKING SAME

This application claims the benefit of provisional application 60/336,552, filed Nov. 1, 2001.

FIELD OF THE INVENTION

The present invention relates to hand towels which incorporate both hydrophobic and hydrophilic components. In particular, the present invention relates to hand towels which allow a user to feel that the towel remains dry, but which also allow for absorption of moisture. Further, the present invention also relates to methods of making such hand towels.

BACKGROUND OF THE INVENTION

After hand washing, typically a paper-based hand towel is used to dry one's hands, particularly in public restrooms. Often, such a towel is used until its outer layer(s) feels wet to the touch, sometimes resulting in moisture remaining on the hands of the user, and a sense that the drying experience has been insufficient. At that point, the wet towel is disposed and another towel may be dispensed to continue drying. Unfortunately, this practice often fails to use the full absorptive capacity of the hand towel. Although the outer layer(s) of the used towel feels wet, the towel may still have unutilized absorptive capacity. However, the user's perception that the hand towel is wet and that its continued use will cause moisture on the towel to retransfer back to the user's hands (i.e. rewetting), causes the user to discard the towel and replace it with a fresh dry one. Consequently, the failure to utilize the towel's full capacity results in waste, either in the extra towels required by the user to attain a dry feeling, or the excess raw materials added by the manufacturer of the towel, in order to compensate for the wet sensation, such excess raw materials assuring adequate absorption of moisture, but in effect, overcompensating by producing hand towels with greater absorption capacity than is truly necessary to assure the dryness objective.

In this regard, personal care products, such as diapers, feminine protective pads, and training pants, have often been produced with superabsorbents to enhance the absorption abilities of a cellulosic or nonwoven material. While such materials may be highly effective for drawing fluid away from the skin contact surface of an absorptive product, such superabsorbents may not be structurally practical, or pose logistical challenges to the construction of a hand towel. Furthermore, such superabsorbents are often costly, and could significantly increase the paper towel cost to the consumer.

While hydrophobic material has been used in connection with paper towels in the past, it is not believed that there has been a use of such materials in a manner that would create a uniform sense of dryness throughout the surface of a paper towel. For instance, U.S. Pat. No. 1,122,959 to Little, for a Paper Towel, describes hydrophobic material which is printed on the surface of a paper towel for strength reinforcement attributes. Such strength reinforcement is accomplished along specific narrow lines on the paper towel surface.

U.S. Pat. No. 5,389,202 to Everhart et al. for a Process for Making a High Pulp Content Nonwoven Composite Fabric, describes a composite nonwoven fabric potentially creating greater than seventy weight percent pulp which is created by hydraulically entangling pulp fibers into a continuous filament substrate. The continuous filament substrate may be hydraulically entangled with one pulp layer on one side and if desired, a different pulp layer on the other side, creating a composite with two pulp-rich sides. The high pulp content may be used in a heavy duty wiper and as an absorbent personal care product as a distribution layer, for improving fluid transport away from the skin of a user to the absorbent layer, increasing separation between the moisture in the absorbent core and the skin of a user.

Finally, U.S. Pat. No. 5,990,377 to Chen et al. for Dual-Zoned Absorbent Webs which is incorporated herein by reference in its entirety, describes a web in which hydrophobic fibers are placed external to paper in order to change the wetting characteristics. The web is a three dimensional absorbent web having both peaks and valleys, of which the hydrophobic material has been deposited on the peaks. The web is used to promote both fluid flow and dry feel. The web is created by depositing hydrophobic matter on the uppermost body contacting regions on the three dimensional hydrophilic web.

Accordingly, there is a need for an affordable hand towel that retains the dry feeling uniformly throughout the entire towel surface, yet continues to absorb moisture during the hand drying process. Such towels would ideally not create the impression of "rewetting" the user. Such a towel could reduce waste by allowing the utilization of substantially the entire absorbency capacity of the towel, thereby reducing towel consumption rates and/or raw material consumption rates (leading to a reduction in towel basis weight). Such a towel could also improve the utility of a single hand towel and ultimately improve overall costs to the consumer.

SUMMARY OF THE INVENTION

An absorbent multilayered web includes a top surface layer, with the top surface layer including first and second fibers, wherein the first fibers are hydrophilic and the second fibers are hydrophobic, and further wherein the first and said second fibers are substantially uniformly distributed on the top surface layer, and at least one additional layer.

As an alternative, such second fibers are included from about 10 to about 50 percent of the top surface layer. As a further alternative embodiment, the hydrophobic fibers are chemically treated cellulosic fibers. In still a further alternative embodiment, the hydrophobic fibers are chemically treated with an amino polysiloxane. In still a further alternative embodiment, the additional layer includes hydrophilic fibers In yet another embodiment of the invention, the absorbent multi-layered web includes a first outer layer and a second outer layer. The first and second outer layers contain first and second fibers. The first fibers are hydrophilic and the second fibers are hydrophobic. Such first and second fibers are substantially uniformly distributed on the first and second outer layers of the web. A third, middle layer is disposed between the first and second outer layers, and contains predominantly hydrophilic fibers. In an alternative embodiment of this embodiment, the second fibers make up from about 10 to about 50 percent of the first and second outer layers.

A method of making an absorbent multi-layered web includes the steps of providing hydrophilic fibers; providing hydrophobic fibers; forming a first web layer of substantially uniformly distributed hydrophilic and hydrophobic fibers; creating at least a second web layer; and joining said first layer with said web second layer.

DETAILED DESCRIPTION OF THE INVENTION

Figure 1:
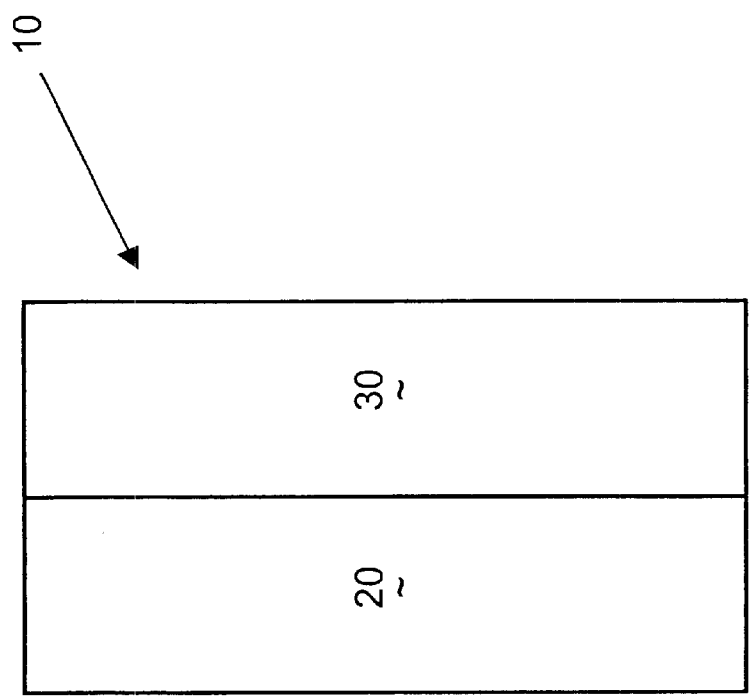
FIG. 1 represents a cross-sectional view of a paper towel in accordance with the invention, the towel having two layers in a single-ply.

Definitions:

In describing the webs of this invention and their fluid-handling characteristics, a number of terms and tests are used which are described below.

As used herein, "high yield pulp fibers" are those papermaking fibers of pulps produced by pulping processes providing a yield of about 65 percent or greater, more specifically about 75 percent or greater, and still more specifically from about 75 to about 95 percent. Yield is the resulting amount of processed fiber expressed as a percentage of the initial wood mass. Exemplary high yield pulps include bleached chemithermomechanical pulp (BCTMP), chemithermomechanical pulp (CTMP) pressure/pressure thermomechanical pulp (PTMP), thermomechanical pulp (TMP), thermomechanical chemical pulp (TMCP), high yield sulfite pulps, and high yield Kraft pulps, all of which contain fibers having high levels of lignin. The desirable high yield pulp fibers can also be characterized by being comprised of comparatively whole, relatively undamaged fibers, having a freeness of 250 Canadian Standard Freeness (CSF) or greater, more desirably 350 CSF or greater, and still more desirably 400 CSF or greater, and low fines content (less than 25 percent, more desirably less than 20 percent, still more desirably less that 15 percent, and even still more desirably less than 10 percent by the Britt jar test). In addition to common papermaking fibers, high yield pulp fibers also include other natural fibers such as milkweed seed floss fibers, abaca, hemp, kenaf, bagasse, cotton and the like. Such fibers may be used in the described invention.

The term "hydrophilic" shall mean a fiber, which allows for the spreading of water. Typically such materials demonstrate the physical attribute of having a surface energy greater than about 50 dynes/cm.

The term "hydrophobic" shall generally refer to fibers that possess a surface that does not promote the spreading of water. The water instead, forms drops and a contact angle that can be measured from the plane of the fiber surface, tangent to the water surface at the three-phase boundary line (air-water-fiber). Typically the contact angle ranges from 40–110 degrees, and is often greater than 90 degrees. The fiber also demonstrates a surface energy of less than about 50 dynes/cm, such as between about 10–50 dynes/cm. Further elaboration on hydrophobic materials may be found in Hydrophobic Surfaces, edited by F. M. Fowkes of the Academic Press, New York, 1969, page 1. Hydrophobic fibers may be produced from materials that are inherently hydrophobic or from hydrophilic fibers that have been treated in some fashion to be hydrophobic.

Contact angles can be measured by standard measurement techniques such as those described in the Introduction to Colloid and Surface Chemistry by Duncan J. Shaw, Third Edition, Butterworths 1980, pages 131–135, incorporated herein by reference. Surface energy can be measured using dyne pen sets, such as those available from UV Process Supply, Inc., of Chicago, Ill. Such pens were utilized in many of the experiments described herein. However, additional methods of measuring surface energy include Torsion Balance apparatus and other devices, which utilize platinum rings, such as those available from Torsion Balance Supplies of the United Kingdom.

As used herein, the term "noncompressive drying" refers to methods for drying cellulosic webs that do not involve compressive nips or other steps causing significant densification or compression of a portion of the web during the drying process. Exemplary methods include through-air drying; air jet impingement drying; non-contacting drying such as air flotation drying, as taught by E.V. Bowden, E. V., Appita J., 44(1): 41 (1991); through-flow or impingement of superheated steam; microwave drying and other radio frequency or dielectric drying methods; water extraction by supercritical fluids; water extraction by nonaqueous, low surface tension fluids; infrared drying; drying by contact with a film of molten metal; and other methods. The base sheets of the present invention are desirably dried with any of the above mentioned noncompressive drying means. Standard dry creping technology is viewed as a compressive drying method since the web must be mechanically pressed onto part of the drying surface, causing significant densification of the regions pressed onto a heated Yankee cylinder. Technology to noncompressively dewater and dry tissue webs with an air press and optionally with a Yankee dryer operated without creping is disclosed in U.S. Pat. No. 6,187,137, to F. G. Druecke et al.; U.S. Pat. No. 6,197,154, to S. Chen et al., and U.S. Pat. No. 6,306,257 to F. Hada et al., all of which are incorporated in their entirety by reference herein. Also of potential value for the paper towel making operations useful in the present invention, is the paper machine disclosed in U.S. Pat. No. 5,230,776 to I. A. Andersson et al.; and the capillary dewatering techniques disclosed in U.S. Pat. Nos. 5,598,643 and 4,556,450, both to S. C. Chuang et al., all of which are incorporated herein by reference. The dewatering concepts disclosed by J. D. Lindsay in "Displacement Dewatering to Maintain Bulk," Paperi ja Puu, 74(3): 232–242 (1992) also provides further guidance in this area.

As used herein, the term "non-rewetting" shall mean a towel that performs in such a manner as to help eliminate or reduce the sensation of rewetting a user's hands during use.

"Rewet" is a measure of the amount of liquid water which can be wicked out of a moistened web into an adjacent dry filter paper and is intended to estimate the tendency of a moistened web to wet the skin. For instance, the Rewet test may be performed by cutting a sample of a tissue web to a rectangle of dimensions of approximately 4 in×6 in. The test may be performed in a Tappi conditioned room (50% Relative Humidity, 73° F.). In such a test, the initial air dry weight of the conditioned sample is recorded, then deionized water may be sprayed onto both sides of the tissue sample to uniformly wet it, bringing the total wet mass of the tissue to a value of 4 times the previously recorded initial air dry weight of the sample, thus bringing the "apparent moisture ratio" of the sample to a value of 3.0 grams (±0.15 g) of added water per gram of conditioned air dry fiber. The process of repeatedly spraying and weighing the sample until the proper mass has been reached should take no more than 2 minutes. Once the sample is wetted, a single dry Whatman #3 filter, which mass has been measured and recorded, may be placed on the center of the wet tissue sample and a load is immediately placed on the filter disk. The load is a cylindrical disk of aluminum having a diameter of 4.5 inches and a thickness of 1 inch for a mass of 723 g. The aluminum disk should be centered about the filter disk. The filter paper on the wet sample remains under load for 20 seconds, at which time the load and the filter paper are immediately removed. The filter paper is then weighed, and the additional mass relative to the initial air dry mass is reported in grams as the Rewet value. Variations of this test may be used, such as that described in the examples which follow.

"Normalized Rewet" is the Rewet value of a sample divided by the dry mass of the sample.

As used herein, the term "substantially uniformly distributed" shall mean distributed generally throughout the entire surface of a web layer, that will contact the skin of a user, as opposed to distributed in some areas of the web surface, and not in others. "Uniform distribution", or "uniformly distributed" will imply generally heterogeneous distribution of both hydrophilic and hydrophobic fibrous materials throughout the entire surface of the web, that will contact the skin of a user.

As used herein, the terms "top surface layer", "top surface of the web", "outer surface layer", and "outer layer" shall be used interchangeably, and shall mean that layer portion of a web or hand towel which makes contact with a user's skin.

As used herein, the term "synthetic" or "synthetic fibers" shall include fibers made from polyolefins, polyesters, polyamides, and blends and copolymers, or fibers formed from other known thermoplastic materials.

As used herein the term "wet-laid" is equivalent to the term "wet-forming" which indicates a process such as, for example, paper making, where a nonwoven material is formed from an aqueous suspension of fibers. Exemplary products which can be made by a wetlaid process include paper, artificial leather, backing for sandpaper and face masks, and include the paper towels/tissues/webs of the current invention. Such towel making methods are described in U.S. Pat. Nos. 4,166,001, 5,494,554, and 5,885,697, which are incorporated by reference herein, in their entirety.

As used herein, "wet resilient pulp fibers" are papermaking fibers selected from the group comprising high-yield fibers, chemically stiffened fibers and cross-linked fibers. Examples of chemically stiffened fibers or cross-linked fibers include mercerized fibers, HBA fibers produced by Weyerhaeuser Corp., and those such as described in U.S. Pat. No. 3,224,926, to L. J. Bernardin, and U.S. Pat. No. 3,455,778, also to L. J. Bernardin. Though any blend of wet resilient pulp fibers can be used, high-yield pulp fibers are the wet resilient fiber of choice for many embodiments of the present invention for their low cost and good fluid handling performance when used according to the principles described below.

The amount of high-yield or wet resilient pulp fibers in a base sheet within a specific absorbent layer or hydrophilic portion to be described later (as opposed to the outer layer(s) with mixed hydrophilic and hydrophobic fibers) is desirably at least about 10 dry weight percent or greater, more desirably about 15 dry weight percent or greater, even more desirably about 30 dry weight percent or greater, still even more desirably about 50 dry weight percent or greater, and still even more desirably from about 20 to 100 percent. For layered basesheets, these same amounts can be applied to one or more individual layers. Because wet resilient pulp fibers are generally less soft than other papermaking fibers, it is advantageous to incorporate them into the middle layer(s) only of a final product, such as placing them in the center layer of a three-layered basesheet or, in the case of a multi-ply product, placing them in the inwardly-facing layers of each of the plies. If it is desired that such fibers should be incorporated into a towel, such fibers may be limited to those areas of the towel not in contact with a user's skin. In those areas which contact a user's skin, softer fibers may be used, such as those commonly found in various tissue products known to those skilled in the art, and described in the examples which follow.

The problems and needs previously described, are addressed by the present invention which provides a base sheet of an absorbent multi-layered web, including both hydrophilic and hydrophobic fibers substantially uniformly distributed along the base sheet top surface (i.e. top surface layer of the web). Essentially, the hand towels in accordance with the invention have a heterogeneous surface chemistry/fiber structure that creates areas that are in contact with the skin that do not contain fluid, or that repel fluid. A towel incorporating such a top surface layer, still absorbs and retains fluids while maintaining a dry feel at the top surface of the web that is in direct contact with a user's skin.

Desirably, as can be seen in FIG. 1, which illustrates a cross-sectional view of a towel in accordance with the present invention, the base sheet of the towel 10 can include a first 20 and second 30 layer. The first and second layers form a single ply, with one or both of the layers constituting a top surface layer for contact with a user's skin. In one embodiment, when one of the layers forms the top surface layer, the other layer is of predominantly hydrophilic/absorbent cellulosic fibers.

Figure 2:
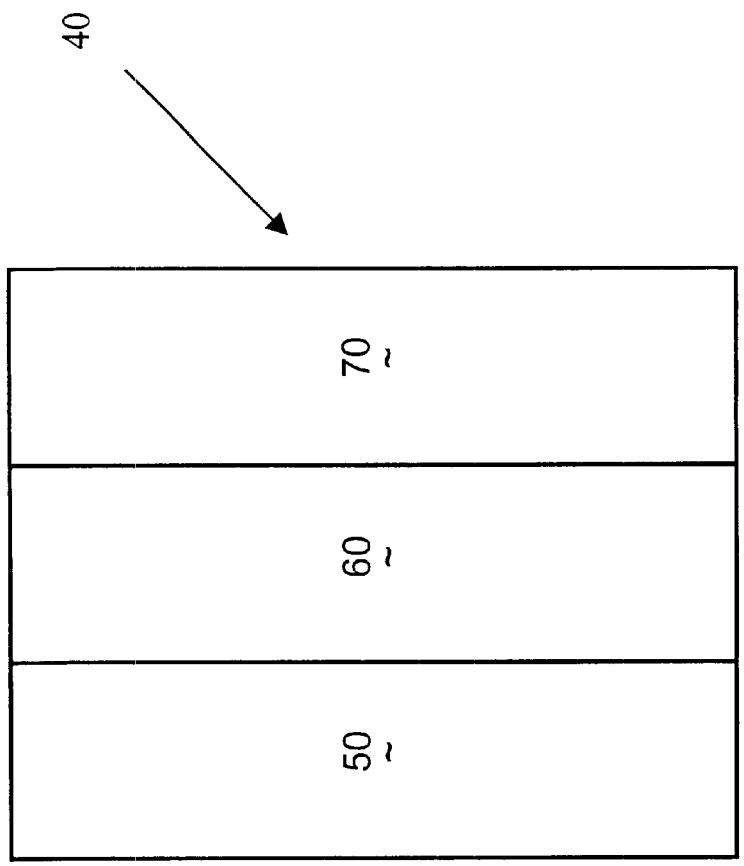
FIG. 2 represents a cross-sectional view of an alternative embodiment of a paper towel in accordance with the invention, the towel having three layers in a single ply.

In an alternative embodiment, as can be seen in FIG. 2, which illustrates a cross-sectional view of an alternative embodiment of a towel made in accordance with the present invention, the first 50 and second 70 layers may substantially sandwich a third layer 60 having different fibers or different properties than the first and second layers in the towel 40. Such a middle layer may incorporate the high yield fibers/wet resilient pulp fibers previously described for example.

Again, as in FIG. 1, the first and second layers 50 and 70, can form the top surface layers of a towel. All three layers may form a single ply. In such an embodiment, high yield hydrophilic/absorbent pulp fibers (or wet resilient pulp fibers) may be strategically placed in certain layers while softer hydrophilic cellulosic fibers, such as those commonly used in tissue applications, could be placed in other areas in contact with the skin of a user. Such softer fibers are exemplified by wood such as white spruce and pine, and hardwoods such as aspen, oak, ash, elm, maples and eucalyptus.

The hydrophobic fibers to be utilized with the softer hydrophilic fibers, may either be cellulosic fibers which have been chemically treated to render them hydrophobic, or in the alternative, fibers formed from inherently hydrophobic synthetic material such as polyolefins, polyesters, polyamides, and blends and copolymers, or fibers formed from other known thermoplastic hydrophobic materials. Desirable, in one embodiment, thermoplastic materials for use as hydrophobic fibers in the present invention include polypropylene fibers.

If such hydrophobic fibers are treated cellulosic fibers, they may be treated with such materials as polysiloxanes, flourine compounds, silicone compounds, polytetrafluoroethylene (PTFE), waxes, polyurethane emulsions, fats, and fatty acid derivatives for example.

In a desirable embodiment, a single-ply product contains between about 10 to about 50 percent hydrophobic fibers in the top surface layer and the remainder hydrophilic fibers. A two-ply product also desirably includes between about 10 to about 50 percent hydrophobic fibers in the top surface layer, with the remainder hydrophilic fibers. Alternatively, a single ply product contains between about 10 to about 50 percent hydrophobic fibers, with the ply made from high loft through-air drying (TAD) in order to further reduce the surface area in contact with the skin. A description of through-air drying technology is provided in U.S. Pat. No. 5,990,377 incorporated herein by reference in its entirety.

In still a further embodiment, a three-layered single ply product includes an inner layer consisting of highly absorbent (hydrophilic) cellulosic fibers such as the high yield fibers previously described, and at least one of, but desirably both of the outer layers including between about 10 to about 50 percent hydrophobic fibers, with the remainder being hydrophilic fibers. In still a further alternate embodiment, the inner layer of the three layered embodiment includes a superabsorbent material. In such a three layered embodiment, the pore size distribution in the inner layer is also optimized to help draw fluid residing in the void spaces away from an outer sheet surface (as fluid in these spaces can contribute to the rewetting phenomena). In order to accomplish this, smaller pore sizes would be preferred which would maximize capillary forces within the materials. In still a further alternate embodiment, the three layered embodiment has three dimensional patterns on the two top surface layers so as to increase the contact of the hydrophobic areas of the sheet on a user's hands. It should be understood that other additives which are routinely incorporated into paper products and are widely known in the paper making art, may be added as well to the fibrous mix. Such additives include wet strength agents (such as polyamine epichlorohydrins) and dry strength agents such as starch and carboxymethyl cellulose, as well as softening agents and debonders. In still a further alternative embodiment, more than one inner middle layers are included in the structure.

It should be recognized that in each of the described embodiments, the outer or top surface layer, which comes in contact with the user's skin, includes the hydrophobic and hydrophilic fibers substantially uniformly distributed in the heterogeneous layer. In one alternative embodiment, the hydrophobic fibers are treated cellulosic fibers. In an alternative embodiment, the hydrophobic fibers are synthetic fibers.

Suitable base sheets for single-ply and multi-ply paper towels can be prepared from aqueous slurries of papermaking fibers with known papermaking techniques. The hydrophilic fibers may be derived from wood, wood-free pulp, or other sources of cellulose and desirably containing a portion of high yield or other wet resilient pulp fibers and an effective amount of wet strength agents. By wood and wood free is meant mechanical and chemical pulp fibers respectively, it being understood that in mechanical pulping, the entire tree is ground down to produce fibers and in chemical pulping, parts of the tree are dissolved using chemicals to produce individual fibers. As previously indicated, the hydrophobic fibers may consist of modified wood and wood free pulp fibers and synthetic petroleum-based fibers.

With respect to pulp fiber modification, the surface chemistry of these fibers can be made more hydrophobic by bonding a variety of chemistries to the surface of the fibers as previously described. The bonding can be through simple Van der Waals attraction, ionic or covalent forces. The covalent bonding typically is produced using grafting techniques. Such chemistries include using sizing agents such as AKD (alkyl ketone dimer), Kymene (epichlorohydrin), polysiloxanes and vinyl monomers. Desirable hydrophobic synthetic fibers include nylon, polypropylene, polyester, polyethylene terthalate (PET), polyvinyl chloride, and a mixed component fiber that includes flourine.

The basesheet can be textured by through-air drying on a three dimensional fabric or other means known in the art and preferably non-compressively dried to give a three-dimensional structure. The inherent stiffness of wet resilient pulp fibers may be reduced, if desired, by incorporation of a suitable plasticizer such as glycerol or by mechanical treatment such as microstraining, dry creping, or calendering.

Through-drying fabrics well suited for formation of three-dimensional webs are disclosed in U.S. Pat. No. 5,429,686, incorporated by reference herein. Other methods such as wet molding, forming on three-dimensional forming fabrics, drying on nonwoven substrates, rush transfer onto embossing fabrics, embossing, stamping, and so forth may be used to create useful three-dimensional structures.

The base sheet may be formed as a unitary multilayer structure in which various plies are well bonded and intimately connected to each other. Such unitary multilayer basesheets may be formed using layered or stratified headboxes in which two or more furnishes are provided into separate chambers of a headbox, or alternatively, they may be formed using separate headboxes by couching the wet webs together prior to drying in order to allow extensive hydrogen bonding to develop between the plies during drying. Furthermore, they may be formed during air-laying by varying the composition of the fibers and additives imparted to the web.

Multilayer sheets allow better control of physical properties by tailoring the material composition of each layer. For example, a unitary multilayer basesheet useful for the present invention would have as previously described, an upper top surface layer, corresponding to the upper surface of the basesheet, and at least one remaining layer below said upper layer and integrally attached thereto, preferably through hydrogen bonds formed between cellulosic fibers during drying, wherein said upper layer differs from at least one remaining layer of the basesheet in terms of material composition. The difference in material composition may be due to differences in fiber species (for example, percentage of hardwood versus softwood or percentage of hydrophobic versus hydrophillic fibers; fiber length; fiber yield; fiber treatment with processes which change fiber morphology or chemistry such as mechanical refining, fiber fractionation, dispersing to impart curl, steam explosion, enzymatic treatment, chemical crosslinking, ozonation, bleaching, lumen loading with fillers or other chemical agents, supercritical fluid treatment, including supercritical fluid extraction of agents in the fiber or supercritical fluid deposition of solutes on and into the cell wall, and so forth. The difference in material composition between the upper layer and at least one other layer in the base sheet also may be due to differences in added chemicals, including the type, nature, or dosage of added chemicals. The chemicals added differentially to at least one layer of the web may include debonding agents, anti- bacterial agents, wet strength resins, starches, proteins, superabsorbent particles, fiber plasticizers such as glycols, colorants, opacifiers, surfactants, zinc oxide, baking soda, silicone compounds, zeolites, activated carbon, and so forth.

As has been indicated, the towel of the current invention may be made using a wet-laid process. Furthermore, the hydrophobic fibers may be mixed with the hydrophilic fibers of at least one of the first or second layers in a headbox as previously indicated. The first or second layers may in a further embodiment include sulfite pulp or BCTMP.

While the towel of the present invention desirably has a total basis weight from about 25 gsm (grams per square meter) to about 60 gsm, the basis weight of the towel may vary depending on the intended end use of the material. The fiber sizes of the hydrophobic fibers are desirably between about 10 and 60 microns in diameter, and between about 0.5 and 3 mm in length. The fiber sizes of the hydrophilic fibers are desirably in the same range. In one embodiment, the hydrophilic fibers are comprised of soft wood cellulosic materials such as Northern Softwood Kraft, while the hydrophobic fibers are comprised of treated cellulosic material. If the hydrophobic fibers are made by traditional meltspinning nonwoven techniques well known in the art of nonwoven technology, the fibers then may be incorporated in the hydrophilic fiber slurry during routine paper manufacturing steps.

Furthermore, if a third middle layer is included (as part of a single ply structure) as has been previously described, the third layer may have higher absorbency, through larger percentages of the hydrophilic materials, and demonstrate higher wicking, than the first and second layers.

In still another embodiment of the invention, a towel may include a first ply including a first top surface layer having hydrophilic fibers and hydrophobic fibers and a second layer having hydrophilic fibers with higher absorbency than the first layer. The second layer should be positioned proximate to the first layer. A second ply may be bonded to the first ply and be generally a mirror image thereof.

In general, it has been discovered that the substantially uniform distribution of hydrophobic fibers with hydrophilic fibers on the top surface layer of a towel, can enhance the suitability of such a towel for use in hand drying, by reducing the amount of fluid that can remain in contact with the skin or flow back to the skin during drying, thus resulting in an improved dry feel, and a sensation that the towel is not rewetting the hand during the drying process.

The following examples are designed to aid in understanding the invention, but are not meant to limit the scope of the invention. For the purposes of the examples, the term "OD" shall refer to oven dried (at 105° C.±2° C.). The weights of the hand sheets samples tested ranged from between 3.11 to 3.89 grams. The inner layer on two and three layered base sheets was made from 800 ml of 0.3% consistency cellulose slurry. It should be understood that for the purposes of the examples, the inner layer was the untreated absorbent layer. The inner layer was also positioned closest to the screen on the handsheet mold. The outer layer was made from 100 ml of 0.3% consistency cellulose slurry. It should be understood that the outer layer was the treated layer (including both treated and untreated cellulosic fibers), and was also the layer on the handsheet mold away from the screen.

When cellulose had been treated to create hydrophobic fibrous material, generally between 1 and 15% polysiloxanes (NuDry 30, OSI-Witco Corporation) were utilized (percents are in percent total solids). The polysiloxane was an amino polysiloxane in solution. The volume of solution ranged from 50 ml to 300 ml, depending on the example. Although larger total solids percentages may be used, no perceived benefit of such larger concentrations was realized. In fact, larger percentages between 10% and 15% were difficult to uniformly apply, despite demonstrating lessened rewetting at higher percentage treated fibers in the final product. Typically, the fibers were treated by adding 1–5% of the polysiloxane solution (in an amount of 50 ml) to stock, mixing for 5 minutes, and then removing the excess so as not to contaminate the untreated fibers. The differently treated fibers were then blended to the untreated fibers (i.e. to stock). The blend of treated to untreated fibers were accomplished utilizing the ratios which follow in Table 1.

Hand sheets were made using Tappi Test Method T205 sp-95. The handsheets were made in a standard TAPPI handsheet mold using both a 200 mesh screen and a through air dryer fabric placed on top of the screen. The fibers used were Northern Softwood Kraft, Southern Softwood Kraft, and Eucalyptus. If synthetic fibers, as opposed to treated cellulosic fibers, were to be used, they could be incorporated into the sheets such as in 2–3 denier polypropylene fibers cut in the range of 1–2 mm in length. The layers could then be combined while wet and then dryed in restraint rings to form layered handsheet structures. All of the handsheets were unpressed.

EXAMPLES

Example 1

The initial experiment involved creating a handsheet that has an inner and outer layer (two layers). The outer layer (farthest from the screen in the hand sheet mold) had chemically treated cellulose fibers contained within it. The inner layer (core) was composed of Eucalyptus stock 800 ml 0.3% consistency. This formulation allowed for a good absorbent inner core to be established.

The outer layer was composed of 100% softwood cellulose fibers. However, some of the fibers were treated with a hydrophobic chemical agent, while others were not. This layer consisted of a total of 0.3 g fiber, 100 ml at 0.3% consistency. Several varying percentages were used as a ratio of treated and untreated fibers in the outer layer. These are shown below in Table 1 as a ratio of treated to untreated fibers. These are shown as the "percent" and ml of each, as well as the gF of each, with gF being grams of dry fiber.

TABLE 1

| Sample # | Treated (% and ml) | Treated (gF) | Untreated (% and ml) | Untreated (gF) |
|---|---|---|---|---|
| 1 | 100 | 0.30 | 0 | 0.00 |
| 2 | 80 | 0.24 | 20 | 0.06 |
| 3 | 60 | 0.18 | 40 | 0.12 |
| 4 | 40 | 0.12 | 60 | 0.18 |
| 5 | 20 | 0.06 | 80 | 0.24 |
| 6 (Control) | 0 | 0.00 | 100 | 0.30 |

The method of treating the fibers was to mix the fibers to be treated with the chemical treatment (polysiloxanes), remove the excess liquid out in a Buchner funnel, wash the fibers and repeat the funneling. The first attempt included making a large batch of treated fibers by using 600 ml 0.3% consistency stock and adding 300 ml at 15% solids chemical treatment (polysiloxane identified), filtering, washing, filtering and drying (OD). It was determined that the hydrophobic fibers produced would not disperse well in water at these percentages and volumes. As a result, the following procedures were followed in the next examples.

Example 2

To generally demonstrate an example of an absorbent web with improved dry feel, a handsheet was prepared in a British Handsheet Mold using Tappi standard procedures. The handsheet was made from a blend containing both cellulosic and synthetic fibers, as well as a blend of treated and untreated cellulosic fibers. The treated or modified cellulosic fibers were treated with an aminopolysiloxane. These handsheets were then placed on top of an untreated handsheet to produce a multi-ply structure. The rewetting was measured by pouring water on the sheet, covering it with a dry filter paper, applying pressure, and measuring the moisture pick-up of the filter paper.

Example 3

The experiment involved creating a handsheet that had an inner/untreated and outer/treated layer (two layers). The inner layer was created from 800 ml of a eucalyptus fiber slurry at 0.3% consistency. The outer layer was created from a mixture of chemically untreated and treated softwood cellulose fibers. The outer layer was produced using the following methodology. A 600 ml sample of 0.3% consistency softwood fiber slurry was separated from the larger 0.3% consistency softwood fiber slurry. A 50 ml sample of the 5% total solids chemical treatment was added to the softwood fiber slurry sample. This mixture was stirred to ensure uniformity of the chemical onto the fiber slurry. The excess chemical was then removed from the mixture via a Buchner funnel. The fibers were washed with water to remove additional excess chemistry and then funneled again. At this point, it is required that the percent consistency of the treated fiber sample be known in order to determine the overall percent consistency of the softwood sample prior to making the handsheets. It was important that the overall percent consistency of the softwood sample be known so that the handsheets could be made to the desired weight. The percent consistency, $(gfiber/(gfiber+gwater))*100$, of the treated fibers was determined by taking a known sample of the treated fibers, making a handsheet with that sample, drying the sample in an oven until oven dry, and then weighing the handsheet. The treated softwood fibers were added to an untreated softwood fiber slurry in the correct ratio. This softwood fiber slurry was used along with the inner layer in making the handsheets for testing.

Samples of the handsheet were then tested using the following procedure. The handsheet was placed on top of a 4-inch filter paper. 2 ml of water was poured on top of the handsheet. Approximately 15 seconds was allowed to elapse. Another 4-inch filter paper was placed on top of the sample. A 200-gram weight, evenly distributed, was placed on the top filter pad. Approximately 30 seconds were allowed to elapse. The weight was then removed and the top filter paper was weighed. The difference between the initial filter paper weight and the final filter paper weight (with the water) is the amount of water that "rewet" back from the sample. This value can be known as the "rewet" value or the "water" value (as stated in the Table 2) and is designated in grams. It is important to determine how much water will rewet back from the sample for every gram of fiber weight. Each sample is not the same weight and the amount of water that can be absorbed into the handsheet is dependent upon the amount of fiber in the sample. Thus, a "normalized rewet" value is established that takes the amount of fiber in each sample, or alternatively the weight of the sample, into consideration. The normalized rewet value is calculated by dividing the water weight in grams by the web weight in grams. The amount of water that will rewet from the sample is now identified per gram of fiber as opposed to per web sample. In order to get the normalized rewet value into a more meaningful number, the "decreased rewet" or the "non rewetting performance" value was calculated. The non rewetting performance value is calculated by dividing the normalized rewet value of the control sample (sample #6) by the quantity of the normalized rewet value of the control less the normalized rewet value of the experimental sample (samples #1–5). This value depicts the percentage by which the experimental sample decreased the "rewet" in comparison to the control sample.

The handsheets were prepared in a TAPPI standard handsheet mold using TAPPI Test Method T 205 sp-95 Forming handsheets for physical tests of pulp. (TAPPI Press, Atlanta.)

Non-rewetting performance for various hydrophobic/hydrophilic ratios is shown in the following Table 2.

TABLE 2

| Samp. # | Treat. % + ml | Treat. (gF) | Untre. % + ml | Untre. (gF) | Web (g) | Filter Initial (g) | Filter Final (g) | Water (g) | Norm Rewt | Dec Rewt. (%) |
|---|---|---|---|---|---|---|---|---|---|---|
| 1 | 100 | 0.30 | 0 | 0.00 | 3.64 | 1.39 | 1.41 | 0.02 | 0.005 | 82 |
| 2 | 80 | 0.24 | 20 | 0.06 | 3.11 | 1.44 | 1.46 | 0.02 | 0.006 | 79 |
| 3 | 60 | 0.18 | 40 | 0.12 | 3.79 | 1.39 | 1.42 | 0.03 | 0.008 | 74 |
| 4 | 40 | 0.12 | 60 | 0.18 | 3.37 | 1.39 | 1.43 | 0.04 | 0.012 | 62 |
| 5 | 20 | 0.06 | 80 | 0.24 | 3.29 | 1.43 | 1.49 | 0.06 | 0.018 | 41 |
| 6 | 0 | 0.00 | 100 | 0.30 | 3.89 | 1.43 | 1.55 | 0.12 | 0.031 | — |

In the above table, the abbreviation "Samp. #" refers to sample number, "Treat %" refers to treated cellulosic fiber percentage, "Treat. (gF)" refers to treated cellulose in grams dry fiber, "Untre. %" refers to untreated cellulose fiber percentage, "Untre. (gF)" refers to Untreated grams dry fiber, "Filter Initial" refers to initial filter weight, "Filter Final" refers to final filter weight, "Water" refers to water weight on filter paper (or Rewet), "Norm Rewt" refers to normalized rewet values, and "Dec Rewt (%)" or Decreased Rewet, refers to Decreased rewetting performance percentage or percent reduction in moisture transferred to the 4 inch filter paper. Sample # 6 was the control.

Figure 3:
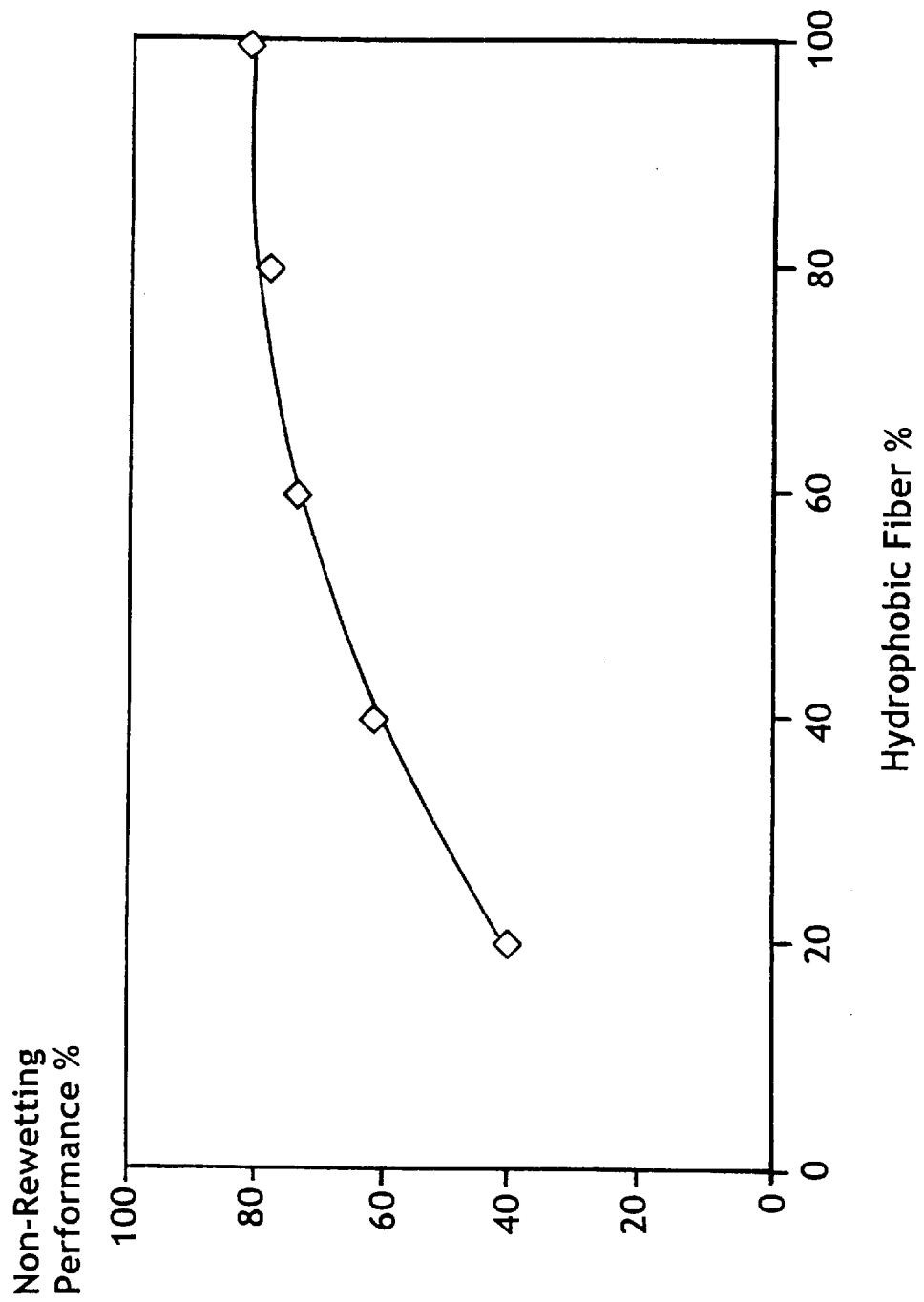
FIG. 3 represents a data depiction, in graph form, of Non-Rewetting Performance vs. Concentration of Hydrophobic Fibers in Towels in accordance with the present invention.

The data for this table is reflected in FIG. 3 which illustrates Non-rewetting performance percentages, that is the ability to not re-transfer wetness onto another surface from the paper towel tested, versus the percentage of hydrophobic fiber in the top surface layer of a hand towel made using the above preparation. The results demonstrate that as the amount of treated cellulose fibers increases, the decreased rewet value increases.

It should also be appreciated that the blending of hydrophilic and hydrophobic fibers throughout the surface of an article, may also occur in other personal care products, such as in a tissue, wipe, diaper liner or other absorbent consumer product components.

While the invention has been described in detail with particular reference to the preferred embodiments thereof, it should be understood that many modifications and additions may be made thereto, in addition to those expressly recited, without departure from the spirit and scope of the invention as set forth in the following claims.

What is claimed is:

1. An absorbent multilayered web comprising:
   a top surface layer, said top surface layer including first and second fibers, wherein said first fibers are hydrophilic and said second fibers are hydrophobic, chemically treated, cellulosic fibers, and further wherein said first and said second fibers are substantially uniformly distributed on the top surface layer;

at least one additional layer.

2. The absorbent multilayered web of claim 1 wherein said second fibers comprise from about 10% to about 50% of said top surface layer.

3. The absorbent multi-layered web of claim 1 wherein said hydrophobic fibers are chemically treated with amino polysiloxane.

4. The absorbent multi-layered web of claim 3 wherein said amino polysiloxane concentration is between about 1 and 5% solids.

5. The absorbent multi-layered web of claim 1 wherein said absorbent multi-layered web is a wet-laid tissue sheet.

6. The absorbent multi-layered web of claim 1, wherein said additional layer includes hydrophilic fibers.

7. The absorbent multi-layered web of claim 6, wherein said hydrophilic fibers predominate said additional layer.

8. The absorbent multi-layered web of claim 6, wherein said hydrophilic fibers include high yield pulp fibers.

9. An absorbent towel comprising the absorbent multi-layered web of claim 1.

10. A personal care article comprising the absorbent multi-layered web of claim 1.

11. An absorbent multi-layered web comprising:
  a) a first outer layer and second outer layer, said first and second outer layers containing first and second fibers, said first fibers being hydrophilic and said second fibers being hydrophobic, chemically treated, cellulosic fibers, wherein said first and second fibers are substantially uniformly distributed on the first and second outer layers of the web;
  b) a third middle layer disposed between said first and second outer layers, and containing predominantly hydrophilic fibers.

12. The absorbent multi-layered web of claim 11 further comprising additional layers positioned between said middle layer and said first or second outer layer.

13. The absorbent multilayered web of claim 11 wherein said second fibers comprise from about 10% to about 50% of said first and second outer layers.

14. The absorbent multi-layered web of claim 11 wherein said hydrophobic fibers are chemically treated with amino polysiloxane.

15. The absorbent multi-layered web of claim 14 wherein said amino polysiloxane concentration is between about 1 and 5% solids.

16. The absorbent multi-layered web of claim 11 wherein said absorbent multi-layered web is a wet-laid tissue sheet.

17. The absorbent multi-layered web of claim 14, wherein said hydrophilic fibers include high yield pulp fibers.

18. An absorbent towel comprising the absorbent web of claim 11.

19. A personal care article comprising the absorbent web of claim 11.

20. A method of making an absorbent multi-layered web comprising the steps of:
  a) providing hydrophilic fibers;
  b) providing hydrophobic, chemically treated, cellulosic fibers;
  c) forming a first web layer of substantially uniformly distributed hydrophilic and hydrophobic fibers;
  d) creating at least a second web layer;
  e) joining said first layer with said second layer.

21. An absorbent multilayered web comprising:
  a top surface layer, said top surface layer including first and second fibers, wherein said first fibers are hydrophilic and said second fibers are hydrophobic synthetic fibers between about 0.5 and 3.0 millimeters in length, and further wherein said first and said second fibers are substantially uniformly distributed on the top surface layer;
  at least one additional layer.

22. The absorbent multilayered web of claim 21 wherein said second fibers comprise from about 10% to about 50% of said top surface layer.

23. The absorbent multi-layered web of claim 21 wherein said synthetic fibers are polypropylene fibers.

24. The absorbent multi-layered web of claim 21 wherein said absorbent multi-layered web is a wet-laid tissue sheet.

25. The absorbent multi-layered web of claim 21, wherein said additional layer includes hydrophilic fibers.

26. The absorbent multi-layered web of claim 25, wherein said hydrophilic fibers predominate said additional layer.

27. The absorbent multi-layered web of claim 25, wherein said hydrophilic fibers include high yield pulp fibers.

28. An absorbent towel comprising the absorbent multi-layered web of claim 21.

29. A personal care article comprising the absorbent multi-layered web of claim 21.

30. An absorbent multilayered web comprising:
  a) a first outer layer and second outer layer, said first and second outer layers containing first and second fibers said first fibers being hydrophilic and said second fibers being hydrophobic synthetic fibers between about 0.5 and 3.0 millimeters in length, wherein said first and second fibers are substantially uniformly distributed on the first and second outer layers of the web;
  b) a third middle layer disposed between said first and second outer layers, and containing predominantly hydrophilic fibers.

31. The absorbent multilayered web of claim 30 further comprising additional layers positioned between said middle layer and said first or second outer layer.

32. The absorbent multilayered web of claim 30 wherein said second fibers comprise from about 10% to about 50% of said first and second outer layers.

33. The absorbent multi-layered web of claim 30 wherein said synthetic fibers are polypropylene fibers.

34. The absorbent multi-layered web of claim 30 wherein said absorbent multi-layered web is a wet-laid tissue sheet.

35. The absorbent multi-layered web of claim 30, wherein said hydrophilic fibers include high yield pulp fibers.

36. An absorbent towel comprising the absorbent web of claim 30.

37. A personal care article comprising the absorbent web of claim 30.

38. A method of making an absorbent multi-layered web comprising the steps of:
  a) providing hydrophilic fibers;
  b) providing hydrophobic synthetic fibers between about 0.5 and 3.0 millimeters in length;
  c) forming a first web layer of substantially uniformly distributed hydrophilic and hydrophobic fibers;
  d) creating at least a second web layer;
  e) joining said first layer with said second layer.

* * * * *